(12) United States Patent
Okigami

(10) Patent No.: US 11,445,075 B2
(45) Date of Patent: Sep. 13, 2022

(54) DISPLAY SYSTEM, DISPLAY DEVICE, TERMINAL DEVICE, AND DATA MANAGEMENT METHOD WITH NOTIFICATION FUNCTION OF RECEIVING COMMUNICATION DATA

(71) Applicant: SHARP KABUSHIKI KAISHA, Sakai (JP)

(72) Inventor: Masafumi Okigami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/240,898

(22) Filed: Apr. 26, 2021

(65) Prior Publication Data
US 2021/0337076 A1     Oct. 28, 2021

(30) Foreign Application Priority Data
Apr. 28, 2020   (JP) ............................ JP2020-079761

(51) Int. Cl.
*H04N 1/00*     (2006.01)
*H04N 1/32*     (2006.01)

(52) U.S. Cl.
CPC ..... *H04N 1/00477* (2013.01); *H04N 1/00413* (2013.01); *H04N 1/32* (2013.01); *H04N 2201/0093* (2013.01)

(58) Field of Classification Search
None
See application file for complete search history.

(56) References Cited

U.S. PATENT DOCUMENTS

| | | | |
|---|---|---|---|
| 10,158,781 B2 * | 12/2018 | Uruma | H04N 1/2179 |
| 10,728,416 B1 * | 7/2020 | Soejima | H04N 1/2338 |
| 2007/0136673 A1 * | 6/2007 | Minamida | G06Q 10/10 709/216 |
| 2007/0153324 A1 * | 7/2007 | Verma | H04N 1/00238 358/1.15 |
| 2009/0116076 A1 * | 5/2009 | Nagano | H04N 1/00477 358/403 |
| 2012/0087484 A1 * | 4/2012 | Trandal | H04N 1/32795 379/100.01 |
| 2016/0142564 A1 * | 5/2016 | Kida | H04N 1/2104 358/1.15 |
| 2016/0366291 A1 * | 12/2016 | Jimbo | H04N 1/00244 |
| 2019/0260905 A1 | 8/2019 | Kaisha | |
| 2019/0373122 A1 * | 12/2019 | Kawase | H04N 1/00129 |

(Continued)

FOREIGN PATENT DOCUMENTS

JP     2019-146008 A     8/2019

*Primary Examiner* — Henok Shiferaw
(74) *Attorney, Agent, or Firm* — ScienBiziP, P.C.

(57) ABSTRACT

In a display system including a communication device including a communication function, a display device, and a terminal device, the display system includes an acquirer that acquires communication data via the communication device, a display that displays information based on the received communication data on the display device, and a notifier that notifies the terminal device that the communication data has been received. When an operation corresponding to the notification is performed on the terminal device, the display further displays that the operation corresponding to the notification is performed as information relating to the communication data.

3 Claims, 16 Drawing Sheets

(56) References Cited

U.S. PATENT DOCUMENTS

| | | | |
|---|---|---|---|
| 2020/0302070 A1* | 9/2020 | Nakayama | G06F 3/1222 |
| 2021/0103415 A1* | 4/2021 | Okigami | G06F 3/1285 |
| 2021/0168262 A1* | 6/2021 | Sato | H04N 1/00689 |
| 2021/0256481 A1* | 8/2021 | Suzuki | G06Q 10/02 |

* cited by examiner

FIG. 2

| ID | RECEPTION DATE AND TIME | TRANSMISSION SOURCE | RECIPIENT | REPLIER |
|---|---|---|---|---|
| 01002 | 2020/02/28 13:31:25 | ABC | P, Q, R | — |
| 01003 | 2020/02/28 13:46:10 | ABC | — | — |
| 01004 | 2020/02/28 14:20:18 | ABC | P, Q, R | P |
| ... | ... | ... | ... | ... |
| 01011 | 2020/02/28 15:15:58 | 06XXXXYYYY | — | — |

FIG. 8A

| TRANSMISSION SOURCE | RECEPTION DATE AND TIME | REPLY · READ | |
|---|---|---|---|
| E F G | 02/28 14:20 | | |
| A B C | 02/28 14:10 | | |
| A B C | 02/28 14:00 | ● P | Ⓟ Ⓠ Ⓡ |
| A B C | 02/28 13:46 | | |
| A B C | 02/28 13:31 | ○ | Ⓟ Ⓠ Ⓡ |

FIG. 8B

| STATUS | REPLY | READ | RECEPTION DATE AND TIME | TRANSMISSION SOURCE |
|---|---|---|---|---|
| | | | 02/28 14:20 | E F G |
| | | | 02/28 14:10 | A B C |
| 👍 | P | P, Q, R | 02/28 14:00 | A B C |
| | | | 02/28 13:46 | A B C |
| ⬇ | | P, Q, R | 02/28 13:31 | A B C |

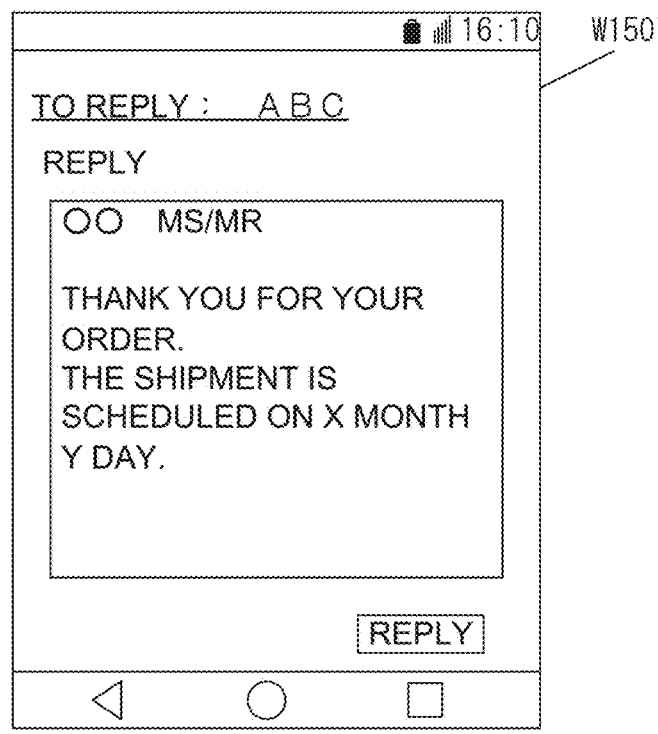

FIG. 16

| RECEPTION DATE AND TIME | TRANSMISSION SOURCE | REPLY | READ |
|---|---|---|---|
| 2/28 14:20 | EFG | | Q |
| 2/28 14:10 | ABC | | |
| 2/28 14:00 | ABC | P | PQR |
| 2/28 13:46 | ABC | | |
| 2/28 13:31 | ABC | | PQR |

W400

DISPLAY SYSTEM, DISPLAY DEVICE, TERMINAL DEVICE, AND DATA MANAGEMENT METHOD WITH NOTIFICATION FUNCTION OF RECEIVING COMMUNICATION DATA

FIELD OF THE INVENTION

The present invention relates to a display system and the like.

DESCRIPTION OF THE BACKGROUND ART

There has been known a technology in which an image forming device having a facsimile function manages whether received facsimile data is printed (see, for example, Japanese Unexamined Patent Application Publication 2019-146008).

However, in the conventional technique, it is not possible to easily confirm an operation performed by a user to communication data such as the received facsimile data.

It is an object of the present disclosure to provide a system or the like capable of easily confirming a user's operation performed to received communication data.

SUMMARY OF THE INVENTION

In a display system of the disclosure including a communication device including a communication function, a display device, and a terminal device, the display system includes an acquirer that acquires communication data via the communication device, a display that displays information based on the received communication data on the display device, and a notifier that notifies the terminal device that the communication data has been received, when an operation corresponding to the notification is performed on the terminal device, and the display further displays that the operation corresponding to the notification is performed as information relating to the communication data.

In a display system of the present disclosure including a communication device having a communication function, a storage device, a display device, a terminal device, and a management server, the communication device stores communication data in the storage device when the communication device receives the communication data, the display device displays information relating to communication data stored in the storage device, the management server transmits a first notification to the terminal device when communication data is stored in the storage device, and the management server updates information relating to communication data stored in the storage device when the management server receives a second notification indicating that an operation has been performed on the terminal device.

A display device of the present disclosure includes a controller, a display, and a communicator, and the controller acquires information that a communication device including a communication function has received communication data, displays information based on the acquired communication data, transmits a first notification indicating that the communication data has been received to a terminal device via the communicator, receives a second notification indicating that an operation corresponding to the first notification has been performed on the terminal device from the terminal device via the communicator, and further displays information based on the second notification as information based on the acquired communication data.

A display device of the present disclosure includes a controller, a display, and a communicator, and the controller acquires information that a communication device including a communication function has received communication data, displays the acquired communication data in a list on the display, displays a user by operation together with communication data displayed in a list when a notification indicating that the user has performed at least one of an operation of displaying the communication data on the terminal device and an operation of replying to the communication data via the communicator is received from the terminal device.

A terminal device of the present disclosure includes a controller, a display, and a communicator, and the controller acquires information that a communication device including a communication function has received communication data, displays the acquired communication data in a list on the display, acquires a user who has performed at least one of an operation of displaying the communication data and an operation of replying to the communication data via the communicator, and displays the user by operation together with communication data displayed in the list.

In a data management method of the present disclosure for managing communication data received by a communication device including a communication function by a management table, the data management method includes notifying a terminal device that a communication device has received communication data when the communication device has received the communication data, acquiring information that a user has performed at least one of an operation of displaying the communication data and an operation of replying to the communication data on the terminal device, and updating the management table by associating the acquired operation and a user who has performed the operation with the communication data.

According to the present embodiment, it is possible to easily confirm a user's operation performed to received communication data.

BRIEF DESCRIPTION OF THE DRAWINGS

FIG. 2 is a diagram for explaining an example of the data structure of a management table according to the first embodiment.

FIG. 8A and FIG. 8B indicate a diagram for explaining an operation example (screen example) according to the first embodiment.

FIG. 10A and FIG. 10B indicate a diagram for explaining an operation example (screen example) according to the first embodiment.

FIG. 16 is a diagram for explaining a modified example.

DESCRIPTION OF THE PREFERRED EMBODIMENTS

Figure 1:
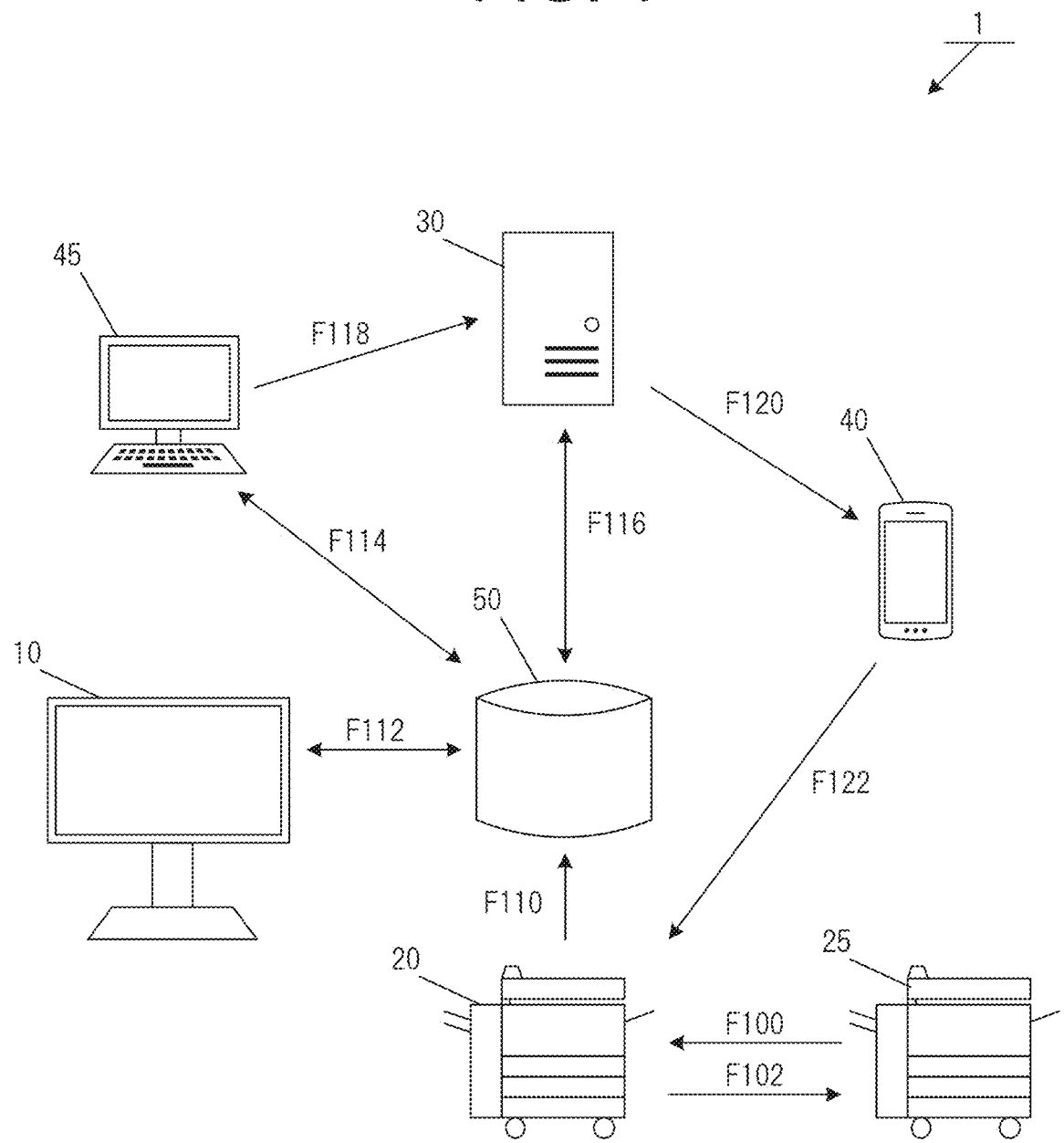
FIG. 1 is a diagram for explaining the entire system according to a first embodiment.

Hereinafter, embodiments of the present disclosure will be described with reference to the drawings. It should be noted that the following embodiments are examples for explaining the present disclosure, and the technical scope of the invention described in the claims is not limited to the following description.

Conventionally, a communication device having a communication function such as a facsimile function or an image forming device called a digital multifunction device can display communication data such as facsimile data received by communication such as facsimile communication (communication for transmitting and receiving facsimile data using a facsimile line or an Internet line) and reply to such received communication data. Note that, in the present embodiment, facsimile data will be described as an example of the communication data.

Since facsimile data is generally printed on a recording sheet or the like, the conventional image forming device can manage whether the facsimile data has been printed.

However, with the development of digital technology in recent years, there has been an increasing need for a user to receive facsimile data on a terminal device such as a smartphone and a tablet terminal. In this case, when facsimile data is received or displayed by a terminal device different from a communication device (image forming device) having a facsimile function, another user cannot confirm whether the user actually displayed the facsimile data.

Further, the user may desire to reply to the transmission source of the facsimile data displayed on the terminal device. However, in order to reply through the facsimile line, the user needs to return to a place where a communication device is placed (for example, a company) once or request another employee to reply on behalf of the user, and therefore, it cannot be said to be easy to use.

A system or the like for solving such a problem will be described below based on detailed embodiments.

Note that the data received by the facsimile communication is referred to as facsimile data. Further, simply transmitting and receiving a FAX means transmitting and receiving facsimile data.

In addition, in the present specification, "acquire" means that a device acquires data. For example, when a first device, which is the acquisition source, acquires data from a second device, which is the acquisition destination, it is sufficient that the first device can acquire the data, and either of the following two methods may be used.

(1) The second device transmits the facsimile data to the first device. The first device receives the data to acquire the data. Note that the timing at which the second device transmits the data to the display device may be a trigger generated by the second device or may be a response to a request from the first device.

(2) The first device reads the data from the second device to acquire the data. For example, when the data is stored in a shared folder of the second device, the first device may read the data from the shared folder.

1. First Embodiment 1.1 Overall Configuration

FIG. 1 is a diagram for schematically explaining the entire system in the present embodiment. For example, a system 1 includes a display device 10, an image forming device 20, a server device 30, and a terminal device 40. Further, the system 1 may further include a terminal device 45 or a storage device 50.

An outline of the system 1 will be described. First, the image forming device 20 receives facsimile data from another image forming device 25 by facsimile communication (F100).

The image forming device 20 transmits the received facsimile data to the storage device 50 (F110). The storage device 50 is a device generally called a network attached storage (NAS). Note that the image forming device 20 may have the function of the storage device 50. In this case, the storage device 50 is a storage area that can be shared with another device in the image forming device 20. Further, the storage device 50 may be realized by a storage area on an information processing device such as another computer or the cloud.

The display device 10 acquires information relating to the facsimile data from the storage device 50 (F112). It is preferable that the display device 10 is a large display device generally referred to as a signage. Further, the display device 10 may have a configuration in which a plurality of small display devices are arranged, or may be a display screen (web screen) generated on a network.

Further, the storage device 50 may transfer information relating to the facsimile data to the server device 30 (F116). The server device 30 may notify the terminal device 40 based on the facsimile data (F120).

The terminal device 40 is, for example, a portable terminal device such as a smart phone. The terminal device 40 can receive the facsimile data from the server device 30 (F120). Further, the terminal device 40 can execute an operation for replying to the transmission source of the facsimile data. At this time, the terminal device 40 transmits a file for reply generated by the terminal device 40 to the image forming device 20 (F122). Thus, the image forming device 20 can transmit the facsimile data based on the file for reply to the other image forming device 25 which is the transmission source (F102).

Note that the terminal device 40 may transmit the file for reply via the server device 30 or using another facsimile transmission server (facsimile transmission service). Further, the terminal device 40 may transmit the file for reply from the server device 30 to the image forming device 20 via the storage device 50.

Further, when the storage device 50 receives the facsimile data, the storage device 50 may notify the terminal device 45 (F114). The terminal device 45 is, for example, an information terminal device such as a computer used by a user. The user can confirm that the storage device 50 has received the facsimile data via the image forming device 20 by using the terminal device 45. Further, the user can confirm the facsimile data or the operation state of another person by accessing the server device 30 via the terminal device 45 (F118).

1.2 Functional Configuration

Next, the functional configuration of the device used in the first embodiment will be described. Note that in each storage, a common portion regarding a secured storage area and data will be described.

(1) Management Table

The management table is a table for managing facsimile data. For example, the display device 10, the server device 30, and the terminal device 40 stores a management table 112, a management table 312, and a management table 412, respectively.

As an example of the configuration of the management table, for example, FIG. 2 illustrates an example of the data structure of the management table 112. The management table 112 stores information regarding the facsimile data received by the image forming device 20. For example, the display device 10 can manage the date and time of the facsimile data received by the image forming device 20 or the operation state of a user such as display by referring to the management table 112.

As illustrated in FIG. 2, the management table 112 stores an ID (for example, "01002"), a reception date and time (for example, "2020/02/28 13:31:25"), a transmission source (for example, "ABC"), a recipient (for example, "P, Q, R"), and a replier (for example, "–").

The ID is an identification data (ID) for identifying the facsimile data received by the image forming device 20. The ID is assigned so that the system 1 (for example, the image forming device 20) can uniquely identify the facsimile data. The ID may be a unique character string or a character string specifying the facsimile data (for example, a file name of the image data corresponding to the facsimile data).

The reception date and time is the date and time when the image forming device 20 received the facsimile data. The transmission source is information indicating the transmission source of the facsimile data. For example, the information indicating the transmission source may be a telephone number (FAX number) of the transmission source of the facsimile data or a name (transmission source name) corresponding to the telephone number (FAX number). As the information indicating the transmission source, an originating source name (RTI) or an originating source fax number (CSI) included in the transmission side information (TSI: Transmitting Subscriber Identification) may be used. Furthermore, as the information indicating the transmission source, a name previously stored in an address book of the image forming device 20 may be used.

The recipient is a user of the terminal device 40 that has received (displayed) facsimile data on the terminal device 40. For example, the recipient is stored using the name or identification number of the recipient. Further, the replier is a user who has performed a reply operation to facsimile data on the terminal device 40.

One or more recipients and one or more repliers can be stored, respectively. Further, when there is no recipient or replier, the fact or the status indicating null may be stored.

Note that the management table 312 and the management table 412 other than the management table 112 have the same configuration as the management table 112.

Note that, in the present system, one or more display devices 10, one or more image forming devices 20, and one or more terminal devices 40 may be configured as one group. Further, the server device 30 may manage a plurality of groups.

In this case, the server device 30 may have a management table for each group. Further, the server device 30 may include a group attribute and device identification information in the management table 312.

(2) FAX Data (Facsimile Data) Storage Area

The FAX data storage area stores facsimile data received by the image forming device 20. For example, the display device 10, the image forming device 20, the server device 30, and the terminal device 40 store facsimile data in a FAX data storage area 114, a FAX data storage area 214, a FAX data storage area 314, and a FAX data storage area 414, respectively.

The facsimile data is data transmitted and received by the image forming device 20 via facsimile communication, and is image data indicating a text or an image such as a facsimile text or a facsimile image. Further, the facsimile data may include information relating to the facsimile data. For example, the facsimile data may include the reception date and time of the facsimile, the transmission side information (TSI), and the like as attribute information.

Further, the attribute information may be stored as attribute information separately from the image data. Further, the attribute information may be a file name of the image data or a property of the image data.

For example, when facsimile data is received from ABC at 15:46:10 on Mar. 1, 2020, the image data corresponding to the facsimile data may be stored under the file name "20200301154610_ABC_00001.tif". In this way, the information relating to the facsimile data may be stored by any method. Note that the image data may be image data (image file) or the like configured by any format such as Tagged Image File Format (TIFF), Bitmap (BMP), or Portable Document Format (PDF).

(3) Image Data Storage Area

The image data storage area stores image data. For example, the image forming device 20, the server device 30, and the terminal device 40 secure storage areas for an image data storage area 218, an image data storage area 318, and an image data storage area 418, respectively.

The image data is image data to be acquired by each device by a method other than facsimile communication. For example, the image forming device 20 stores image data input by an image input 240 in the image data storage area 218. Further, the terminal device 40 stores image data for reply generated by a FAX processor 402 in the image data storage area 418.

In this way, the image data storage area stores image data acquired by a method other than the facsimile communication. Note that the image data may be an image file such as TIFF or BMP.

1.2.1 Display Device

Figure 3:
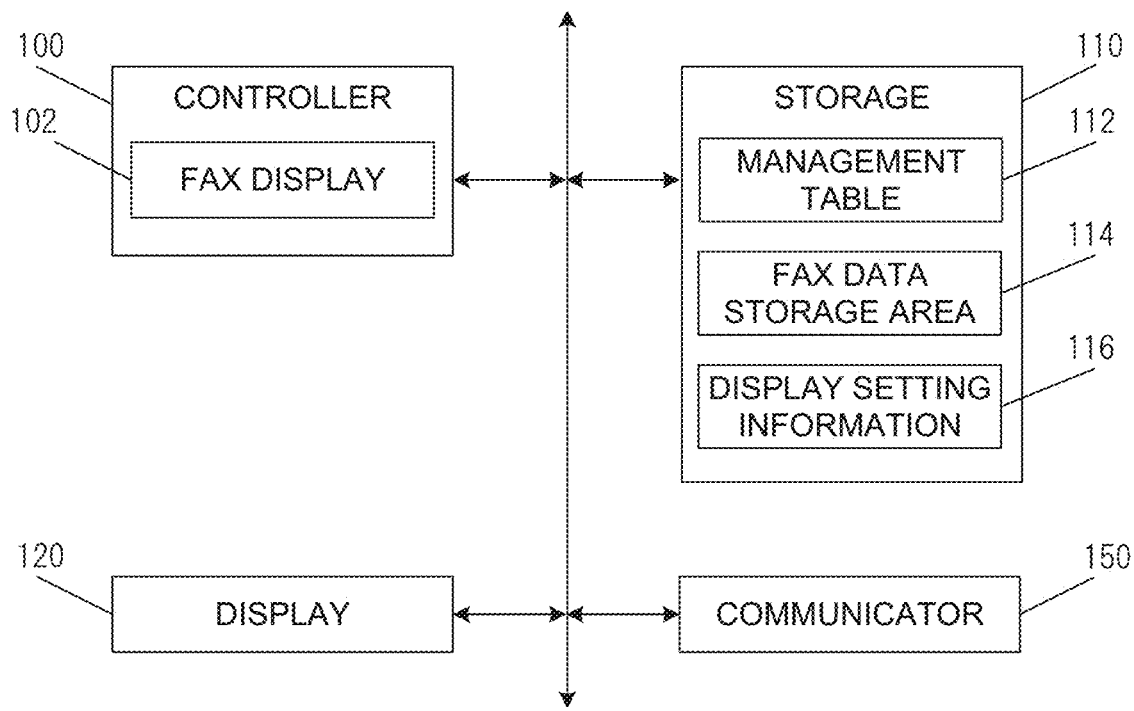
FIG. 3 is a diagram for explaining the functional configuration of a display device according to the first embodiment.

FIG. 3 is a diagram for explaining the functional configuration of the display device 10.

A controller 100 is a functional unit for controlling the entire display device 10. The controller 100 realizes various functions by reading and executing various programs stored in a storage 110, and is configured by, for example, a central processing unit (CPU).

Further, the controller 100 functions as a FAX display 102 by executing a program stored in the storage 110.

The FAX display 102 executes FAX display processing. Here, out of the FAX display processing, receipt FAX display processing is a process of displaying information relating to the facsimile received by the image forming device 20. For example, the following processing can be considered as the receipt FAX display processing.

(1) List Display Screen

The FAX display 102 displays a list of faxes (facsimile data) received by the image forming device 20 on a display 120. In this case, the display device 10 displays a list of information about the received facsimile (reception date and time, transmission source name (transmission source information), and the like).

When the received faxes do not fit on one screen, the FAX display 102 may execute scroll display or display processing by switching screens every time.

Further, the FAX display 102 may display the status of the operation performed by the user in addition to the information relating to the received facsimile. For example, the FAX display 102 may display a user who has operated to display facsimile data (text or image of facsimile). Further, the FAX display 102 may display a user who has performed a reply operation to the facsimile data. Furthermore, the FAX display 102 may display the user by her or his user name or ID, or may display the user by an icon or the like.

(2) Interrupt Display Screen

When the image forming device 20 receives a FAX (facsimile data), the FAX display 102 may execute an interrupt display on the content currently displayed on the display 120.

The FAX display 102 may display a telop in a predetermined area as the interrupt display. Further, the FAX display 102 may use, for example, a balloon display or the like as the interrupt display to superimpose the balloon on the currently displayed content.

Further, the FAX display 102 may control the processing of whether to execute the above processing by referring to display setting information 116.

Further, the FAX display 102 may execute display update processing. The display update processing is a process of updating the screen for showing the list display described above based on information stored in the management table 112. For example, when a user replies to a FAX, the FAX display 102 updates and displays that the user has replied in the list display.

The storage 110 is a functional unit that stores various programs and various data necessary for the operation of the display device 10. The storage 110 is configured by, for example, a semiconductor memory, a hard disk drive (HDD), or the like.

Further, the storage 110 stores the management table 112 and the display setting information 116, and secures an area for the FAX data storage area 114.

The display setting information 116 is information for setting a method of displaying on the display screen in the display device 10. The FAX display 102 switches the display method of the display screen by referring to the display setting information 116.

The display 120 is a functional unit for displaying an image and a character. For example, the display 120 is configured by a liquid crystal display (LCD), an organic electro luminescence (EL) panel, and the like. The display 120 may be a single display device, or may further include a display device connected to the outside. Further, the display 120 may include an irradiation type projector or the like.

A communicator 150 is a functional unit for connecting to a network. For example, the communicator 150 is configured by an interface connectable to a wired LAN, a wireless LAN, or an LTE network. When the communicator 150 is connected to the network, the communicator 150 is connected to another device or an external network.

1.2.2 Image Forming Device

Figure 4:
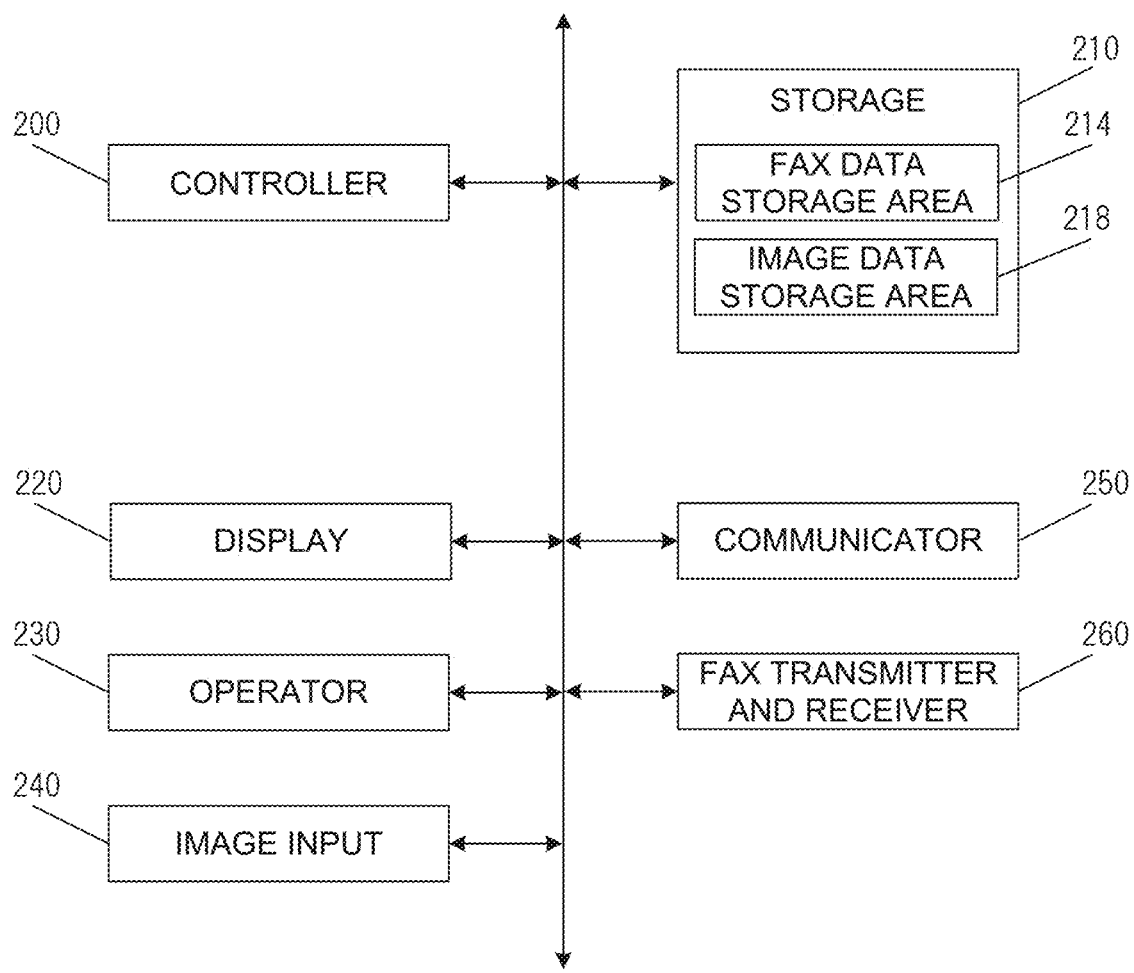
FIG. 4 is a diagram for explaining the functional configuration of an image forming device according to the first embodiment.

FIG. 4 is an example of the functional configuration of the image forming device 20.

A controller 200 is a functional unit for controlling the entire image forming device 20. The controller 200 realizes various functions by reading and executing various programs stored in a storage 210, and is configured by, for example, a CPU.

The storage 210 is a functional unit that stores various programs and various data necessary for the operation of the image forming device 20. The storage 210 is configured by, for example, a semiconductor memory, an HDD, or the like.

Further, the storage 210 secures areas for the FAX data storage area 214 and the image data storage area 218.

A display 220 is a functional unit for displaying an image and a character. For example, the display 220 is configured by a liquid crystal display (LCD) or an organic EL panel. The display 220 may be a single display device, or may further include a display device connected to the outside. Further, the display 220 may include an irradiation type projector or the like.

An operator 230 receives an operation input from a user. For example, the operator 230 is configured by a hardware key and a software key. Further, the operator 230 includes, for example, a task key for executing tasks such as FAX transmission and image reading, a stop key for stopping an operation and the like.

The image input 240 reads an image (original document) and outputs image data. The image input 240 is configured by a general scanner (image input device). Further, the image input 240 may input image data from an external storage medium such as a USB memory or may receive image data via a network.

A communicator 250 is a functional unit for connecting to a network. For example, the communicator 250 is configured by an interface connectable to a wired LAN, a wireless LAN, and an LTE network. The communicator 250 is connected to a network, and therefore the communicator 250 is connected to another device and an external network.

A FAX transmitter and receiver 260 transmits and receives facsimile data via facsimile communication. The facsimile communication can use, for example, a facsimile line based on the G3/G4 standard, or an Internet FAX using the Internet network.

1.2.3 Server Device

Figure 5:
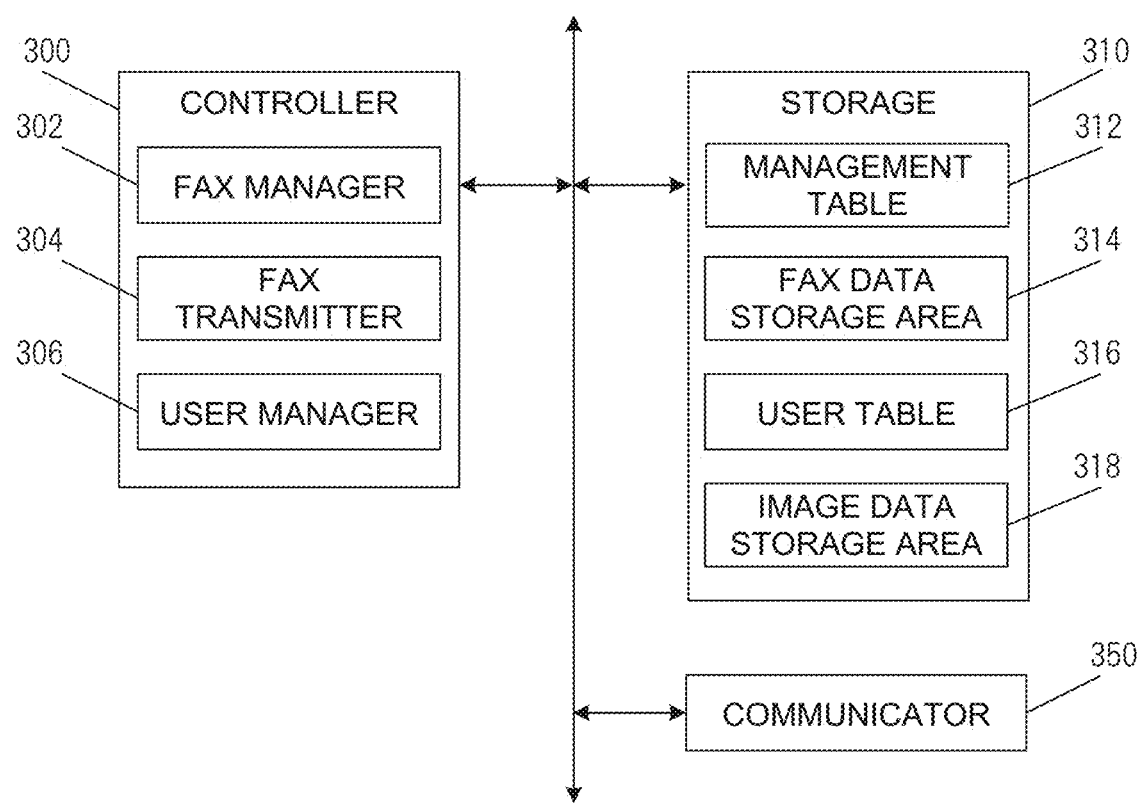
FIG. 5 is a diagram for explaining the functional configuration of a server device according to the first embodiment.

FIG. 5 is a diagram illustrating an example of the functional configuration of the server device 30.

A controller 300 is a functional unit for controlling the entire server device 30. The controller 300 realizes various functions by reading and executing various programs stored in a storage 310, and is configured by, for example, a CPU.

Further, the controller 300 functions as a FAX manager 302, a FAX transmitter 304, and a user manager 306 by reading a program from the storage 310 and executing the program.

The FAX manager 302 manages facsimile data. For example, the FAX manager 302 manages reception of the facsimile data by the image forming device 20, and manages an operation to the facsimile data on the terminal device 40. Further, the FAX manager 302 manages the facsimile data by referring to the management table 312.

The FAX transmitter 304 transmits a request for transmitting a FAX (FAX transmission request) to the image forming device 20. Although the FAX transmitter 304 is described as being realized by the server device 30, the FAX transmitter 304 may be realized by using an external service, for example. Further, as will be described later, the image forming device 20 may include the FAX transmitter 304.

Specifically, the FAX transmitter 304 reads out the image data received from the terminal device 40 from the image data storage area 318. Then, the FAX transmitter 304 transmits a request for transmitting a FAX based on the image data to the image forming device 20.

The user manager 306 manages a user in the system 1. The user manager 306 manages the user based on user information stored in a user table 316.

The storage 310 is a functional unit storing various programs and various data necessary for the operation of the server device 30. The storage 310 is configured by, for example, a semiconductor memory, a hard disk drive (HDD), or the like. Further, the storage 310 stores the management table 312 and the user table 316, and secures areas for the FAX data storage area 314 and the image data storage area 318.

The user table 316 stores information regarding a user (for example, information about authentication) as user information. The user information includes, for example, an ID, a password, an authority, and the like for each user.

Further, in addition to the user information, the user table 316 may store, for example, connection destination information (for example, information related to the Internet Protocol (IP) address and the shared folder) of the display device 10, the image forming device 20, and the terminal device 40.

The user manager 306 can execute user authentication and send notification and data to another device by referring to the user table 316.

A communicator 350 is a functional unit for connecting to a network. For example, the communicator 350 is configured by an interface connectable to a wired LAN, a wireless LAN, and an LTE network. The communicator 350 is connected to a network, and therefore the communicator 350 is connected to another device and an external network.

1.2.4 Terminal Device

Figure 6:
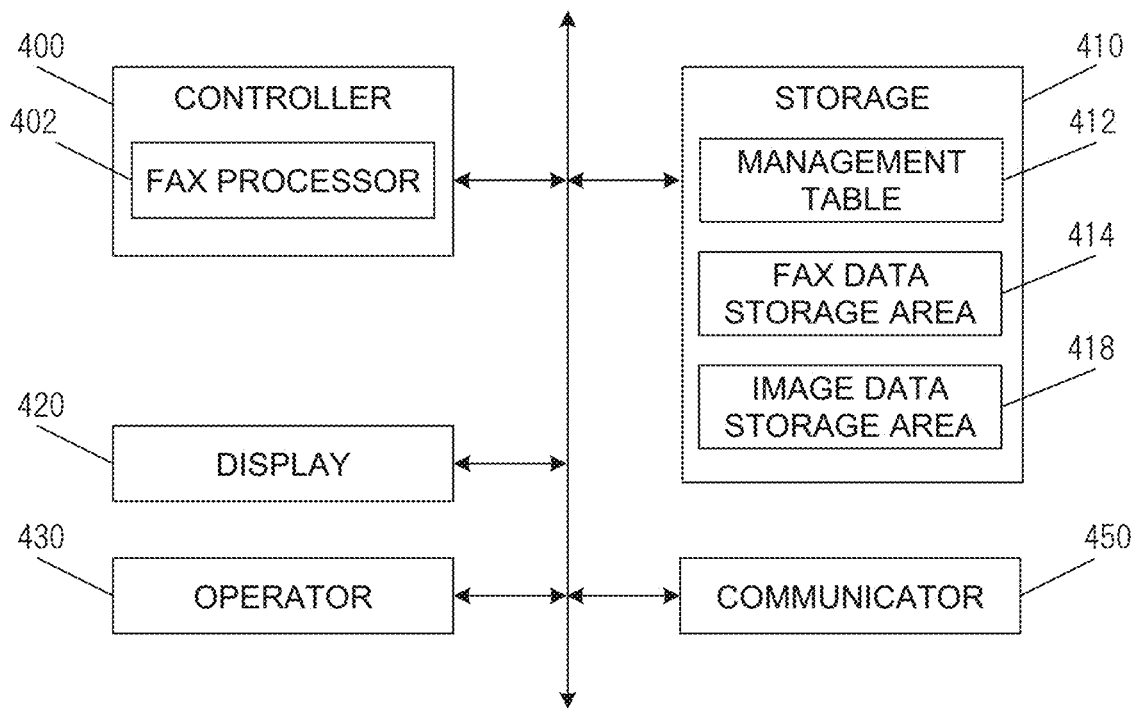
FIG. 6 is a diagram for explaining the functional configuration of a terminal device according to the first embodiment.

FIG. 6 is a diagram illustrating an example of the functional configuration of the terminal device 40.

A controller 400 is a functional unit for controlling the entire terminal device 40. The controller 400 realizes various functions by reading and executing various programs stored in a storage 410, and is configured by, for example, a CPU or the like.

Further, the controller 400 functions as the FAX processor 402 by reading a program from the storage 410 and executing the program.

The FAX processor 402 is realized by the terminal device 40 executing an application stored in the storage 410. The application may be stored in the terminal device 40 in advance, or may be downloaded from the outside via a communicator 450. Further, the FAX processor may be a service provided on a network. The FAX processor 402 can execute the following processing.

(1) Fax List Display Processing

The FAX processor 402 can display a list of a plurality of faxes received by the image forming device 20. The FAX processor 402 displays information such as the reception date and time when the FAX was received and the transmission source. Further, the FAX processor 402 may display different information such as the number of pages and the type of standard as information relating to the FAX.

Further, the FAX processor 402 may display a list of the operation states of the user. For example, the FAX processor 402 may display a list of whether there is in the "read" state in which the operation of downloading and displaying each FAX is executed. Further, the FAX processor 402 may display a list of whether there is in the "reply" state in which a reply operation is executed to each FAX.

Further, the FAX processor 402 may display, as the operation state of the user, only the user's operation state, or the user's operation state together with the operation state of another user.

Here, when the operation state of another user is displayed, the FAX processor 402 updates the management table 412 as appropriate. For example, the FAX processor 402 may update the management table 412 by referring to the management table 312 of the server device 30 at the timing of communication with the server device 30 and at predetermined intervals.

Further, the terminal device 40 does not necessarily need to store the management table 412. In this case, the terminal device 40 may directly refer to the management table 312 of the server device 30 or the management table 112 of the display device 10.

(2) FAX Confirmation Processing

The FAX processor 402 can display facsimile data selected from a plurality of faxes displayed in a list by the user. When the user selects a FAX to be displayed, the FAX processor 402 acquires the facsimile data from the server device 30.

(3) FAX Reply Processing

The FAX processor 402 executes FAX reply processing in response to a reply operation performed by the user. When the user performs the reply operation for a selected FAX, for example, the FAX processor 402 generates image data for reply. Then, the FAX processor 402 transmits the image data for reply to the server device 30 together with the FAX transmission request.

The storage 410 is a functional unit that stores various programs and various data necessary for the operation of the terminal device 40. The storage 410 is configured by, for example, a semiconductor memory, an HDD, or the like. Further, the storage 410 stores the management table 412, and secures areas for the FAX data storage area 414 and the image data storage area 418.

A display 420 is a functional unit for displaying an image and a character. For example, the display 420 is configured by a liquid crystal display (LCD), an organic EL panel, and the like. The display 420 may be a single display device or may further include a display device connected to the outside.

An operator 430 receives an operation input from a user. For example, the operator 430 is configured by a hardware key and a software key.

The communicator 450 is a functional unit for connecting to a network. For example, the communicator 450 is configured by an interface connectable to a wired LAN, a wireless LAN, or an LTE network. The communicator 450 is connected to a network, and therefore the communicator 450 is connected to another device and an external network.

1.3 Processing Flow

Figure 7:
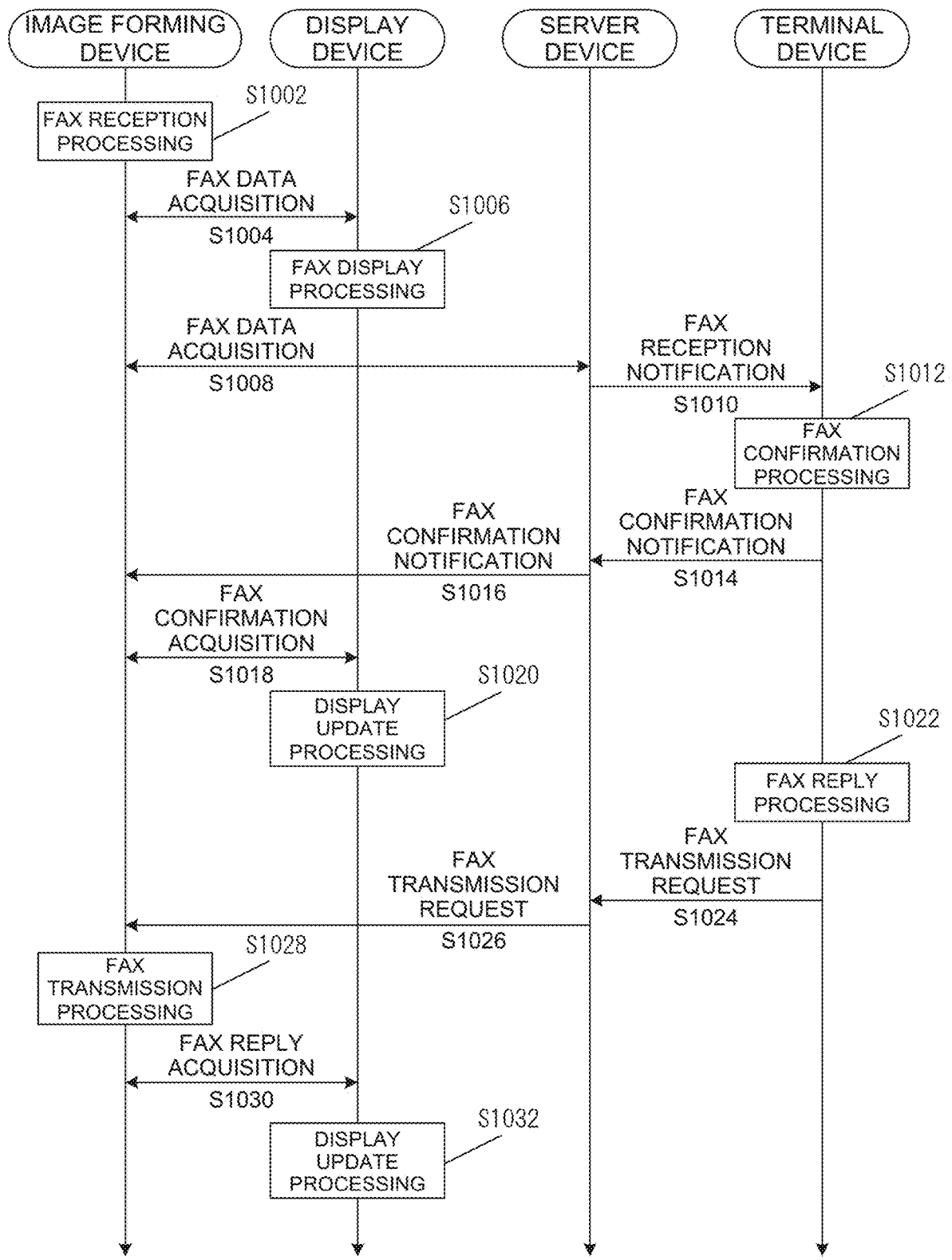
FIG. 7 is a diagram for explaining a processing flow according to the first embodiment.

FIG. 7 is a diagram for explaining the overall flow of the system 1. The system 1 of the first embodiment includes the image forming device 20, the display device 10, the server device 30, and the terminal device 40.

First, the image forming device 20 receives facsimile data from another device via the FAX transmitter and receiver 260 (S1002).

Subsequently, the display device 10 receives the facsimile data from the image forming device 20 (S1004). Specifically, the controller 100 in the display device 10 receives the facsimile data from the image forming device 20 via the communicator 150. Alternatively, the controller 200 in the image forming device 20 transmits the facsimile data to the display device 10 via the communicator 250. That is, the trigger for the display device 10 to acquire the facsimile data may be the image forming device 20 or the display device 10. For example, the display device 10 polls an other device at regular intervals to acquire the facsimile data stored in the other device or to acquire newly stored facsimile data at the timing of polling.

Further, the timing at which the display device 10 acquires the facsimile data may be each time the image forming device 20 receives the facsimile, or may be based on the processing of receiving the facsimile data from the display device 10 on a regular basis.

Further, in step S1004, the display device 10 may receive the facsimile data itself or only information relating to the facsimile data. That is, it is sufficient that the display device 10 (controller 100) can acquire at least the date and time when the image forming device 20 receives the facsimile data and the related information.

Subsequently, the display device 10 executes the receipt FAX display processing (S1006). Further, the server device 30 acquires the facsimile data (FAX data) from the image forming device 20 (S1008).

Here, the timing at which the server device 30 acquires the facsimile data may be the timing at which the image forming device 20 receives the facsimile data. That is, when the image forming device 20 receives the facsimile data via the facsimile communication, the image forming device 20 transmits the received facsimile data to the server device 30.

Further, the server device 30 may periodically execute the processing of acquiring the facsimile data to the image forming device 20. For example, the server device 30 may query the image forming device 20 or read out the facsimile data stored in the FAX data storage area 214 every thirty seconds or every minute. Here, the FAX data storage area 214 may be realized by, for example, a shared folder or the like.

Furthermore, the server device 30 may acquire only new facsimile data, all stored facsimile data, or only facsimile data not received by the user.

Subsequently, when the server device 30 acquires the facsimile data, the server device 30 transmits a FAX reception notification to the terminal device 40 (S1010). When the terminal device 40 receives the FAX reception notification from the server device 30, the terminal device 40 executes FAX confirmation processing (S1012).

At this time, first, the FAX processor 402 in the terminal device 40 displays a list of received faxes. Then, an operation for confirming a certain fax is performed from the faxes displayed in the list. Thus, the terminal device 40 acquires the facsimile data from the server device 30, and displays the facsimile data. That is, the terminal device 40 transmits a FAX confirmation notification to the server device 30 based on the confirmation of the facsimile data by the user (S1014). Further, the FAX confirmation notification may include user information corresponding to the terminal device 40.

When the server device 30 receives the FAX confirmation notification, the server device 30 transmits the FAX confirmation notification to the image forming device 20. Note that the server device 30 also updates the management table 312, and updates the user who executed the FAX confirmation operation as the received user. The server device 30 may specify the received user based on the identification information of the terminal device 40 (for example, an IP address, a terminal name, and login information of an application and the like). Further, the terminal device 40 may specify the user based on the user information included in the FAX confirmation notification.

The server device 30 transmits the FAX confirmation notification to the image forming device 20 (S1016). Further, the display device 10 acquires, from the image forming device 20, information that the FAX confirmation notification has been received (S1018).

Thus, the display device 10 updates the management table 112, and updates the user who has performed the FAX confirmation operation as the received user. Then, the display device 10 executes the display update processing (S1020). Specifically, the FAX display 102 updates the list display based on the updated management table 112.

For example, the display device 10 updates the list display based on the user who has performed the FAX confirmation operation (for example, the operation to display the FAX) on the terminal device 40. Further, the display device 10 displays a telop based on the user who has performed the FAX confirmation processing (for example, the processing of displaying the FAX) on the terminal device 40.

Further, when the user performs the FAX reply operation, the terminal device 40 executes the FAX reply processing (S1022). The FAX processor 402 generates image data for reply by executing the FAX reply processing. Then, the FAX processor 402 transmits the generated image data together with the FAX transmission request to the server device 30 (S1024).

When the server device 30 receives the FAX transmission request from the terminal device 40, the server device 30 transmits the FAX transmission request to the image forming device 20 (S1026). Note that the server device 30 may update the management table 312 along with the transmission of the FAX transmission request. For example, the FAX manager 302 updates the management table 312 with the user who has performed the FAX reply operation as the user who has replied.

The image forming device 20 receives the FAX transmission request and executes FAX transmission processing (S1028). For example, the image forming device 20 generates facsimile data based on the image data included in the FAX transmission request. Then, the image forming device 20 transmits the generated facsimile data to the image forming device of the transmission source via the facsimile communication.

Further, the display device 10 acquires from the image forming device 20 whether the FAX has been replied (S1030). For example, the display device 10 refers to the transmission log of the image forming device 20 or the transmitted facsimile data to acquire whether the FAX has been replied. Further, the image forming device 20 may notify the server device 30 of the fact.

When the display device 10 acquires information that the FAX has been replied, the display device 10 updates the management table 112. Further, the updated display device 10 refers to the management table 112 to execute the display update processing (S1032). Specifically, the FAX display 102 updates the list display based on the updated management table 112.

For example, the display device 10 updates the list display based on the user who has performed the FAX reply operation on the terminal device 40. Further, the display device 10 displays a telop based on the user who has performed the FAX reply operation on the terminal device 40.

1.4 Operation Example

Next, an operation example will be described with reference to the drawings. FIG. 8 is an example of a display screen displayed on the display 120 in the display device 10 according to the present embodiment.

FIG. 8A is an example of a display screen W100 on which the display device 10 displays a list of facsimile data received by the image forming device 20. The display screen W100 displays a list of the transmission source of the received facsimile data and the reception date and time. Further, an area R100 displays the user who has performed the reply operation. Further, an area R102 displays the user who has displayed the facsimile data on the terminal device 40.

Furthermore, the FAX display 102 may execute an identification display for the FAX for which the read operation or the reply operation has been performed. For example, the display screen W100 in FIG. 8A displays the FAX to which the read operation or the reply operation has been performed in a shaded manner. For example, the FAX display 102 may display in reverse or in a different color in addition to the shaded display.

FIG. 8B is an example of a display screen W105 showing a different display mode in the list display. As illustrated on the display screen W105, the FAX display 102 displays the reception date and time and the transmission source information. The FAX display 102 further displays the operated user by her or his name instead of an icon. Further, the FAX display 102 may display an icon in the status column for the FAX to which the read operation or the reply operation has been performed.

Figure 9A:
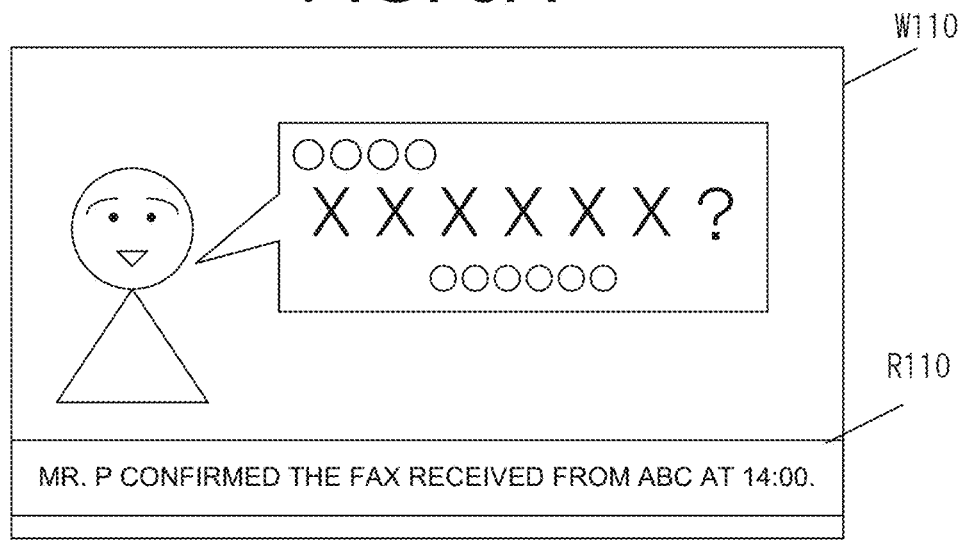
FIG. 9A and FIG. 9B indicate a diagram for explaining an operation example (screen example) according to the first embodiment.

FIG. 9A illustrates an example of an interrupt display screen W110 displayed on the FAX display 102. For example, when another content different from the list display has been already displayed, the FAX display 102 may display a message as in an area R110.

Figure 9B:
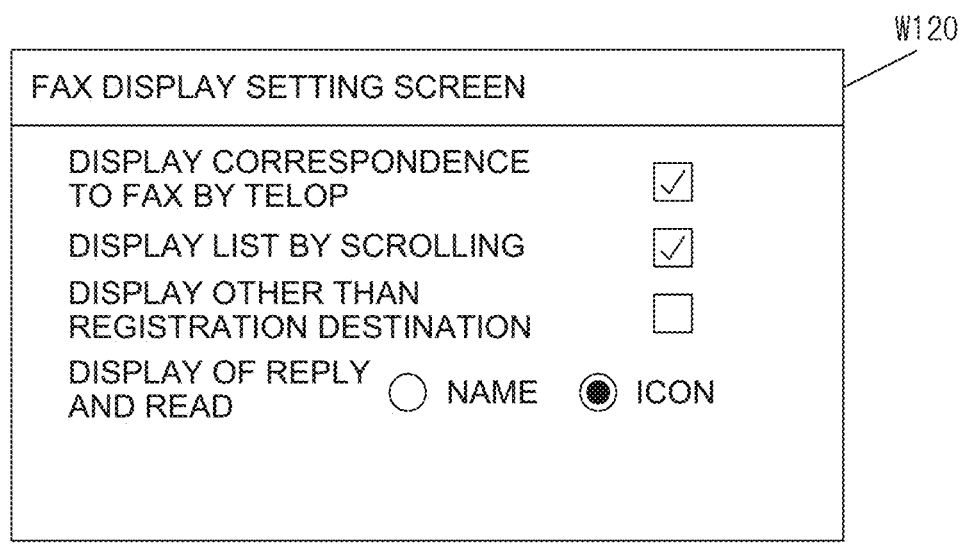

Further, contents displayed on the FAX display 102 can be set on a setting screen W120 as illustrated in FIG. 9B. For example, the following contents can be set on the setting screen W120.

(1) Setting Whether to Display a Message Relating to FAX by a Telop

For example, when a message relating to FAX is set to be displayed by a telop, even if there is a content currently being displayed, the FAX display 102 displays a message indicating reception of a FAX by superimposing the message on the content. Note that the FAX display 102 may display not only the fact that the FAX has been received but also, for example, the case where the user has performed the FAX confirmation operation or the case where the user has performed the FAX reply operation.

(2) Setting Whether to Display a List by Scrolling

For example, when the FAX display 102 displays a list of received faxes, the FAX display 102 can display the list by scrolling.

(3) Setting to Display Other than the Registered Address

For example, when the FAX display 102 displays a list of received faxes, the FAX display 102 can execute a setting that does not display the information other than the transmission source registered in the address book.

(4) Setting for Displaying Reply and Read

For example, the FAX display 102 can set the type of reply or read to be displayed. For example, the FAX display 102 can set whether to display the reply or read by name or icon.

Next, FIG. 10 is a diagram illustrating an example of a display screen on the terminal device 40. A display screen W140 in FIG. 10A displays a list of the received faxes in an area R140. The display screen W140 displays not only the reception date and time and the transmission source information, but also the operation state in the list. For example, when an icon is displayed in the "read" column, the column indicates that the user has performed the confirmation operation. Therefore, for example, when a FAX in which the read column is blank is selected, the FAX processor 402 in the terminal device 40 downloads the facsimile data from the server device 30 and displays the facsimile data.

Further, when the user performs a reply operation, the FAX processor 402 generates a text (image) for reply. A display screen W150 illustrated in FIG. 10B is a screen for displaying a text for reply to the facsimile data. When the user generates a text (image) for reply and performs a reply operation, the FAX processor 402 transmits the FAX transmission request to the server device 30 or the image forming device 20.

As described above, according to the present embodiment, it is possible to easily confirm the operation performed by a user to facsimile data.

Further, according to the present embodiment, the display device 10 can display a list as a reception list, and display the operation state indicating that the FAX has already been read or that a reply to the FAX has been performed. Further, since the display device 10 displays information relating to the user such as read and replied, it is possible to easily confirm the reception status of the FAX and the correspondence status.

Furthermore, according to the present embodiment, it is possible to perform operations such as FAX confirmation and reply to FAX by using the terminal device 40. Accordingly, the user can perform an operation to the received FAX even if the user is not in a place where there is the image forming device 20.

2. Second Embodiment

Next, a second embodiment will be described. The present embodiment describes a configuration in which the system further includes the storage device 50. The present embodiment is different from the first embodiment in the configuration in which the storage device 50 is added, and the configuration different from the first embodiment will be mainly described below. In other words, the description of the configuration common to the first embodiment will be omitted.

2.1 Functional Configuration

Figure 11:
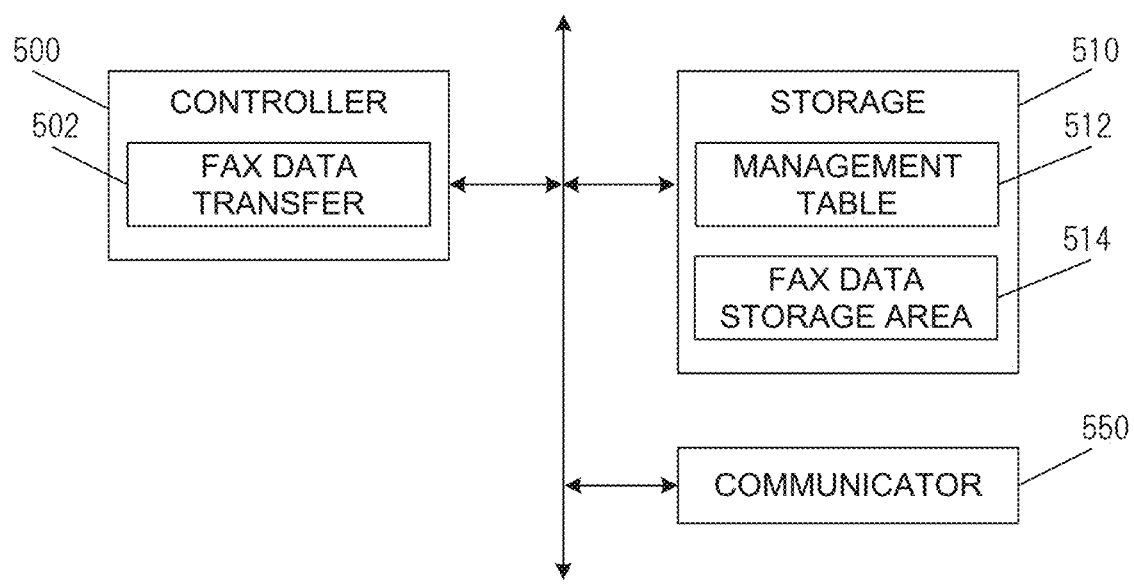
FIG. 11 is a diagram for explaining the functional configuration of a storage device according to a second embodiment.

FIG. 11 is a functional configuration of the storage device 50.

A controller 500 is a functional unit for controlling the entire storage device 50. The controller 500 realizes various functions by reading and executing various programs stored in a storage 510, and is configured by, for example, a central processing unit (CPU) or the like.

Further, the controller 500 functions as a FAX data transfer 502 by reading and executing a program stored in the storage 510.

The FAX data transfer 502 transmits and receives facsimile data. For example, the FAX data transfer 502 can transmit the facsimile data received by the image forming device 20 to the server device 30. Further, the FAX data transfer 502 can transmit the facsimile data and information relating to the facsimile data to the display device 10.

The storage 510 is a functional unit storing various programs and various data necessary for the operation of the storage device 50. The storage 510 is configured by, for example, a semiconductor memory, a hard disk drive (HDD), or the like. Further, the storage 510 stores a management table 512 and secures a FAX data storage area 514.

A communicator 550 is a functional unit for connecting to a network. For example, the communicator 550 is configured by an interface that can be connected to a wired LAN, a wireless LAN, and an LTE network. The communicator 550 is connected to the network, and therefore, the communicator 550 is connected to another device and an external network.

2.2 Process Flow

Figure 12:
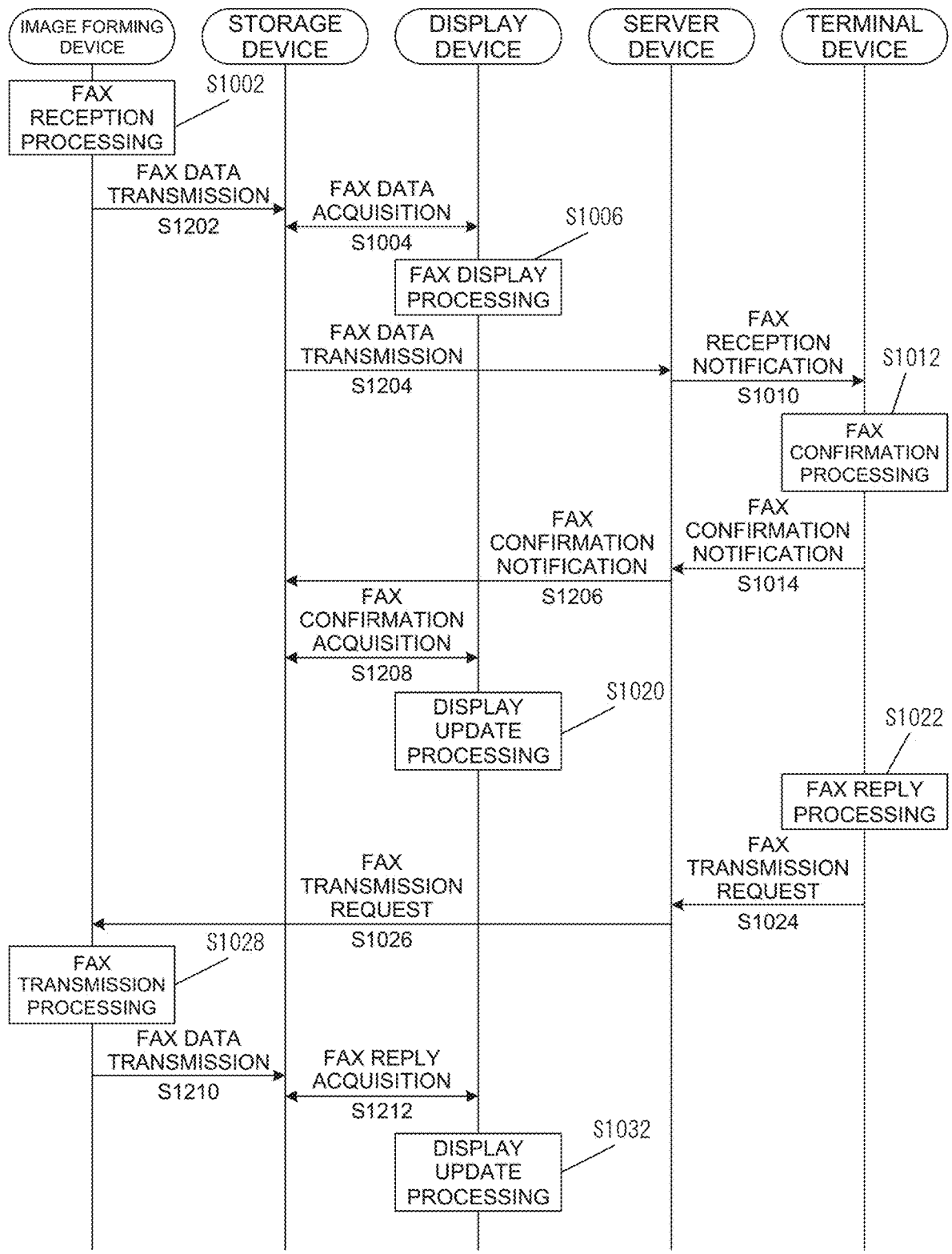
FIG. 12 is a diagram for explaining a processing flow according to the second embodiment.

The processing flow in the present embodiment will be described with reference to FIG. 12. FIG. 12 is a diagram replacing FIG. 7 of the first embodiment. The common reference numerals are given to the processes common to the processes illustrated in FIG. 7, and the description thereof will be omitted. Hereinafter, in FIG. 12, a description will be given mainly on portions different from those in FIG. 7.

The image forming device 20 transmits facsimile data received by the FAX receiving processing to the storage device 50 (S1002 to S1202). The storage device 50 stores the received facsimile data in the FAX data storage area 514.

Then, the display device 10 acquires the facsimile data from the FAX data storage area 514 of the storage device 50. Note that the display device 10 may acquire the facsimile data itself or information relating to the facsimile data. Further, the display device 10 polls at regular intervals to acquire the facsimile data stored in the storage device 50. At this time, the display device 10 may acquire the facsimile data stored in the storage device 50 at the time of polling each time. Further, the display device 10 may acquire new facsimile data stored in the storage device 50.

The storage device 50 transmits the facsimile data to the server device 30 (S1204). Here, the storage device 50 may transmit the facsimile data to the server device 30. Further, the server device 30 may access the storage device 50 to read the facsimile data. That is, it is sufficient that the server device 30 can acquire the facsimile data received by the image forming device 20.

Further, the terminal device 40 may transmit the FAX confirmation notification to the server device 30 after executing the FAX confirmation processing (S1014). The server device 30 transmits the FAX confirmation notification to the storage device 50 (S1206). The display device 10 acquires the FAX confirmation notification (S1208), and then updates the display displayed in S1006 for the user who displayed the FAX (S1020).

Further, when the FAX reply processing is performed on the terminal device 40 (S1022), the image forming device 20 executes the FAX transmission processing (S1028). At this time, the image forming device 20 transmits the facsimile data to the storage device 50 after transmitting the FAX (S1210). Then, when the display device 10 acquires information that the user has replied to the FAX (S1212), the display device 10 executes the display update processing (S1032).

Here, after the image forming device 20 executes the FAX transmission processing (S1028), the image forming device 20 may transmit the facsimile data or information indicating that the facsimile data has been transmitted in S1210.

When the storage device 50 receives the facsimile data or the information indicating that the facsimile data has been transmitted, the storage device 50 may update the management table 512. In this case, in S1212, the display device 10 may acquire information indicating that the FAX has been replied by referring to the management table 512.

As described above, according to the present embodiment, it is possible to transmit and receive facsimile data via the storage device 50. Accordingly, it is possible to provide a system for managing facsimile data separately from the image forming device 20.

3. Third Embodiment

Next, a third embodiment will be described. The third embodiment is an embodiment in which a schedule management service is connected in the system of the first embodiment. The schedule management service may be realized by a server device that constructs the schedule service. Further, the schedule management service may be provided by using a cloud or the like. For example, the service may be provided by an ASP method.

The display device 10 can acquire schedule information for each user from the schedule management service. Thus, the display device 10 can display a schedule for each user in a list, for example.

Figure 13:
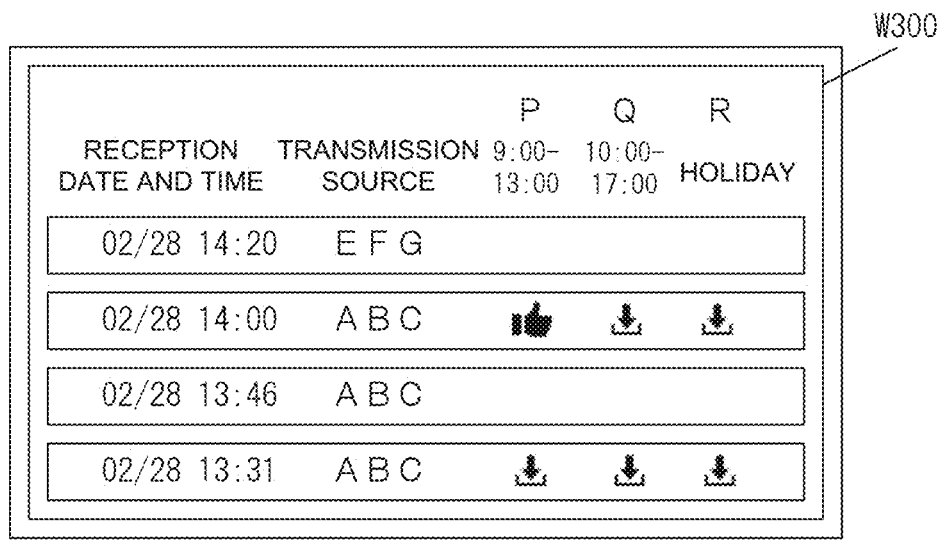
FIG. 13 is a diagram for explaining an operation example (screen example) according to a third embodiment.
Figure 14:
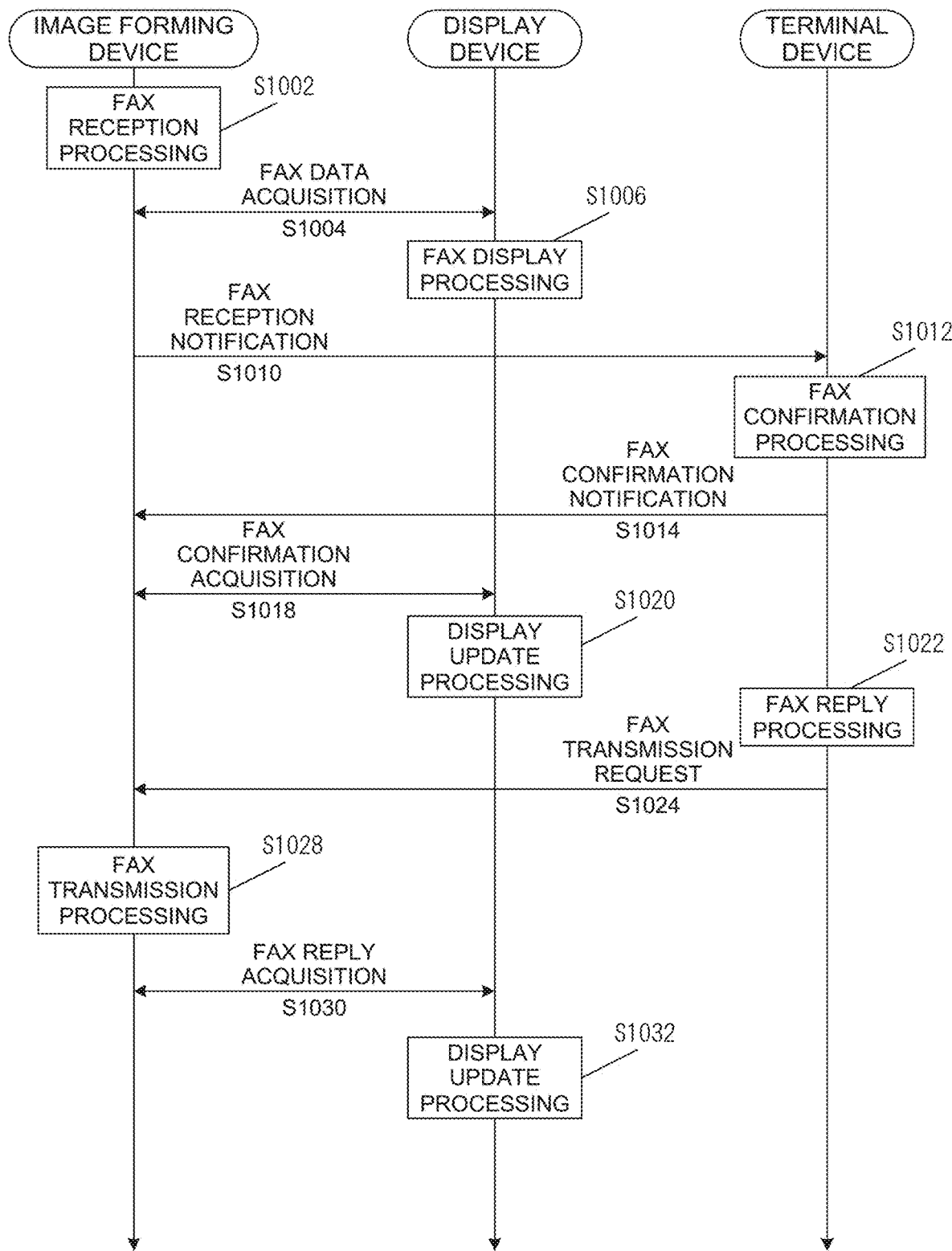
FIG. 14 is a diagram for explaining a processing flow according to a fifth embodiment.

For example, FIG. 13 is an operation example in the present embodiment, and is an example of a display screen W300 when the display device 10 displays on the display 120.

The display device 10 displays a list on the display screen W300 based on the received facsimile data. At this time, the schedule of each user is displayed on a part of the list displayed on the display screen W300.

For example, the display screen W300 illustrates that the user P is in the office during "9:00-13:00" and the user Q is in the office during "10:00-17:00". Further, the display screen W300 illustrates that the user R is on holiday.

Note that the display device 10 can display the contents managed by the schedule management service. For example, the display device 10 may display a visit destination of each user as the schedule.

As described above, according to the present embodiment, it is possible to confirm the schedule of a user and the operation status of facsimile data on one screen. Therefore, for example, when the user has not confirmed facsimile data in spite of the schedule in which the user can confirm the facsimile data, another user can prompt the user to perform the confirmation operation.

4. Fourth Embodiment

Next, a fourth embodiment will be described. Although the system of the first embodiment realizes the FAX transmission processing only by the image forming device 20, the fourth embodiment is an embodiment using an external facsimile transmission service.

For example, in FIG. 7, the terminal device 40 transmits the FAX transmission request to the server device 30, but the terminal device 40 may transmit the FAX transmission request to the facsimile transmission service instead.

The facsimile transmission service may transmit the facsimile transmission request to the image forming device 20 based on the facsimile transmission request received from the terminal device 40.

Then, in step S1030, the display device 10 transmits a FAX from the image forming device 20, but the display device 10 may acquire the FAX from the facsimile transmission service.

As described above, according to the present embodiment, facsimile transmission may be realized via the facsimile transmission service. For example, when an Internet fax is used, it is possible to realize the FAX transmission processing without intervening the image forming device 20.

5. Fifth Embodiment

Next, a fifth embodiment will be described. The present embodiment is an embodiment realized by the minimum device configuration of the system of the first embodiment. That is, it is sufficient that the present embodiment includes the image forming device 20, the display device 10, and the terminal device 40.

That is, according to the present embodiment, the image forming device 20 includes the functions of the server device 30 of the first embodiment. Further, the image forming device 20 includes the functions of the storage device 50 of the second embodiment. For example, the image forming device 20 includes the configuration shown in the controller 300 of FIG. 5, that is, the FAX manager 302, the FAX transmitter 304, and the user manager 306. Further, the image forming device 20 stores the contents stored in the storage 310.

Therefore, when the image forming device 20 receives facsimile data in the FAX reception processing, the image forming device 20 transmits the FAX reception notification to the terminal device 40 (S1010). Further, the terminal device 40 transmits the FAX confirmation notification to the image forming device 20 (S1014).

Further, the terminal device 40 transmits the FAX transmission request to the image forming device 20 (S1024). As described above, according to the present embodiment, it is possible to acquire the same effects as those of the first embodiment only by having the image forming device 20, the display device 10, and the terminal device 40.

Figure 15:
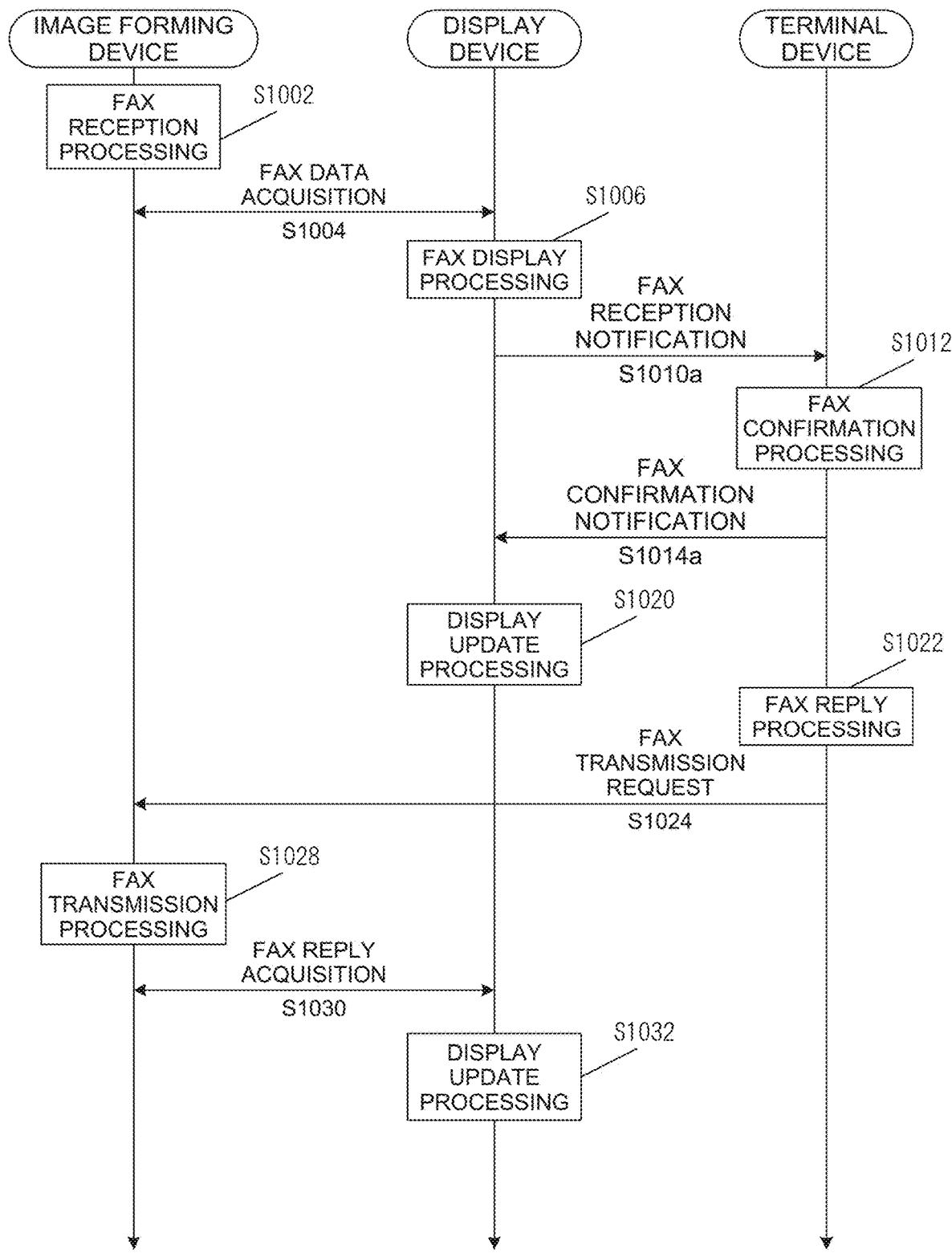
FIG. 15 is a diagram for explaining a processing flow according to the fifth embodiment.

Further, as illustrated in FIG. 15, the display device 10 may transmit the FAX reception notification to the terminal device 40. That is, when the display device 10 acquires FAX data from the image forming device 20 (S1004), the display device 10 displays a list in the FAX display processing (S1006). Then, the display device 10 transmits the FAX reception notification to the terminal device 40 (S1010a). In this case, the display device 10 receives the FAX confirmation notification transmitted from the terminal device 40 (S1014a).

6. Modified Examples

Although the embodiments of the present invention have been described in detail with reference to the drawings, the specific configurations are not limited to the present embodiments, and the design and the like within the scope not departing from the gist of the present invention are also included in the scope of claims.

Further, the techniques disclosed in the above-described embodiments, the application examples, the operation examples, and the modified examples are intended to be realized alone or in combination as much as possible.

Further, in the above-described embodiments, when the display device 10 or the terminal device 40 displays a list, the display of read or reply may be executed by the identification display corresponding to the operation for each user. Further, the display device 10 or the terminal device 40 may execute an identification display corresponding to an operation of an individual user, for example, an operation of oneself or an operation of a specific user. Further, the display device 10 or the terminal device 40 may manage a plurality of users as a group, and execute the identification display in response to the execution of any operation in the group. Furthermore, the display device 10 or the terminal device 40 may switch these identification displays according to the setting or operation.

The display screen W140 in FIG. 10A is a display screen when the terminal device 40 displays a list. At this time, when a predetermined operation (for example, a swipe operation, a double tap operation or the like) is performed on the terminal device 40, the terminal device 40 switches to a display screen W400 illustrated in FIG. 16. The name (identification information) of a user that has performed the operation in association with the operation content is displayed in a list on the display screen W400.

Further, the display device 10 can arbitrarily switch between the display screen W100 illustrated in FIG. 8A and the display screen W105 illustrated in FIG. 8B. Further, the display device 10 can switch the shaded display for identifying the operated FAX to the icon display indicating the situation illustrated in FIG. 8B, on the display screen W100.

In this way, it is possible to flexibly switch or combine the list display screen displayed by the display device 10 or the terminal device 40 in the above-described embodiments.

Further, the program that operates in each device in the embodiments is a program that controls the CPU or the like (a program that causes a computer to function) so as to realize the functions of the above-described embodiments. Then, information handled by the devices is temporarily stored in a temporary storage device (for example, RAM) during the processing, then is stored in various storage devices such as ROM or HDD, and is read, modified, and written by the CPU, as necessary.

Further, when distributing in the market, the program can be stored and distributed in a portable recording medium, or be transferred to a server computer connected via a network such as the Internet. In this case, it is natural that a storage device of the server computer is also included in the present invention.

What is claimed is:

1. A display device comprising:
   a controller; and
   a display,
   wherein the controller acquires information that a communication device comprising a communication function has received communication data, displays information based on the acquired communication data, transmits a first notification indicating that the communication data has been received, to a terminal device via a network, receives a second notification indicating that an operation corresponding to the first notification has been performed on the terminal device, from the terminal device via the network, and further displays information based on the second notification, as information based on the acquired communication data,
   wherein the second notification is a notification indicating that an operation to display communication data has been performed on the terminal device, and
   wherein the controller acquires information of a user who has displayed the communication data on the terminal device, and displays information based on the communication data and information of a user who has displayed the communication data on the terminal device together.

2. The display device according to claim 1,
   wherein the information based on the communication data comprises information of a transmission source of communication data and a reception date and time.

3. The display device according to claim 1, A display device comprising:
   a controller; and
   a display,
   wherein the controller acquires information that a communication device comprising a communication function has received communication data, displays information based on the acquired communication data, transmits a first notification indicating that the communication data has been received, to a terminal device via a network, receives a second notification indicating that an operation corresponding to the first notification has been performed on the terminal device, from the terminal device via the network, and further displays information based on the second notification, as information based on the acquired communication data,
   wherein the second notification is a notification indicating that an operation for replying to communication data has been performed on the terminal device, and
   wherein the controller acquires information of a user who has replied to the communication data on the terminal device, and displays information based on the communication data and information of a user who has performed an operation for replying to the communication data on the terminal device together.

* * * * *